Aug. 28, 1945.  J. P. JOHNSON ET AL  2,383,801
GAS REGULATOR
Filed Oct. 19, 1942  2 Sheets-Sheet 1

Inventors
James P. Johnson & Arthur H. Tidd
By Bair & Freeman
Attorneys

Aug. 28, 1945.　　J. P. JOHNSON ET AL　　2,383,801
GAS REGULATOR
Filed Oct. 19, 1942　　2 Sheets-Sheet 2
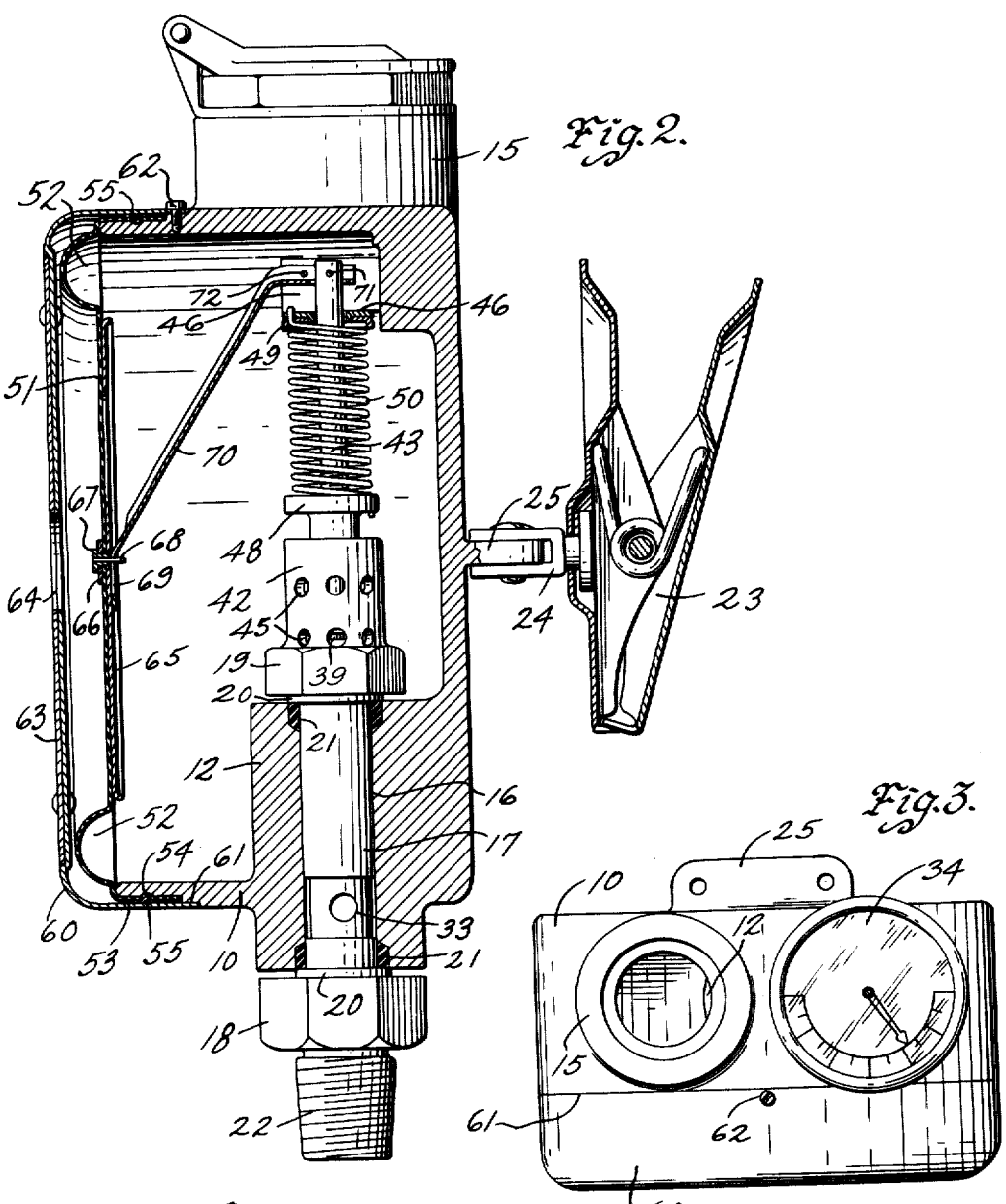
Inventors
James P. Johnson & Arthur H. Tidd
by Bair & Freeman
Attorneys Patented Aug. 28, 1945

2,383,801

UNITED STATES PATENT OFFICE 2,383,801

GAS REGULATOR

James P. Johnson and Arthur Harman Tidd, Cleveland, Ohio, assignors to The Aro Equipment Corporation, Bryan, Ohio, a corporation of Ohio Application October 19, 1942, Serial No. 462,550

2 Claims. (Cl. 50—26)

Our present invention relates to a gas regulator, and particularly to an oxygen regulator of the demand type.

One object of the invention is to provide a regulator of this general character which includes a light, yet large, diaphragm for opening an oxygen valve whenever the wearer of a gas mask, which is attached to the regulator, inhales, the parts being so designed and arranged as to reduce to a minimum the effort required on the part of the user when breathing through the regulator. This is particularly important where the regulator is used for airplane pilots during combat service, when all of their energy is needed to the utmost during actual combat operations.

Another object is to provide a regulator of this general character which may be inexpensively manufactured, and which has the parts so arranged that assembly in a minimum of time is facilitated.

With these and other objects in view, our invention consists in the construction, arrangement and combination of the various parts of our device whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention, both from its structural and functional standpoints. Accordingly, we have illustrated a preferred and desirable embodiment of the invention in the accompanying drawings, in which:

Figure 2 is a vertical, partially sectional view on the line 2—2 of Figure 1;

Figure 3 is a plan view of the regulator omitting a few of the parts forming no part of our invention;

Figure 5 is an enlarged sectional view of a diaphragm sealing means used in the construction of our gas regulator.

Figures 1, 4:
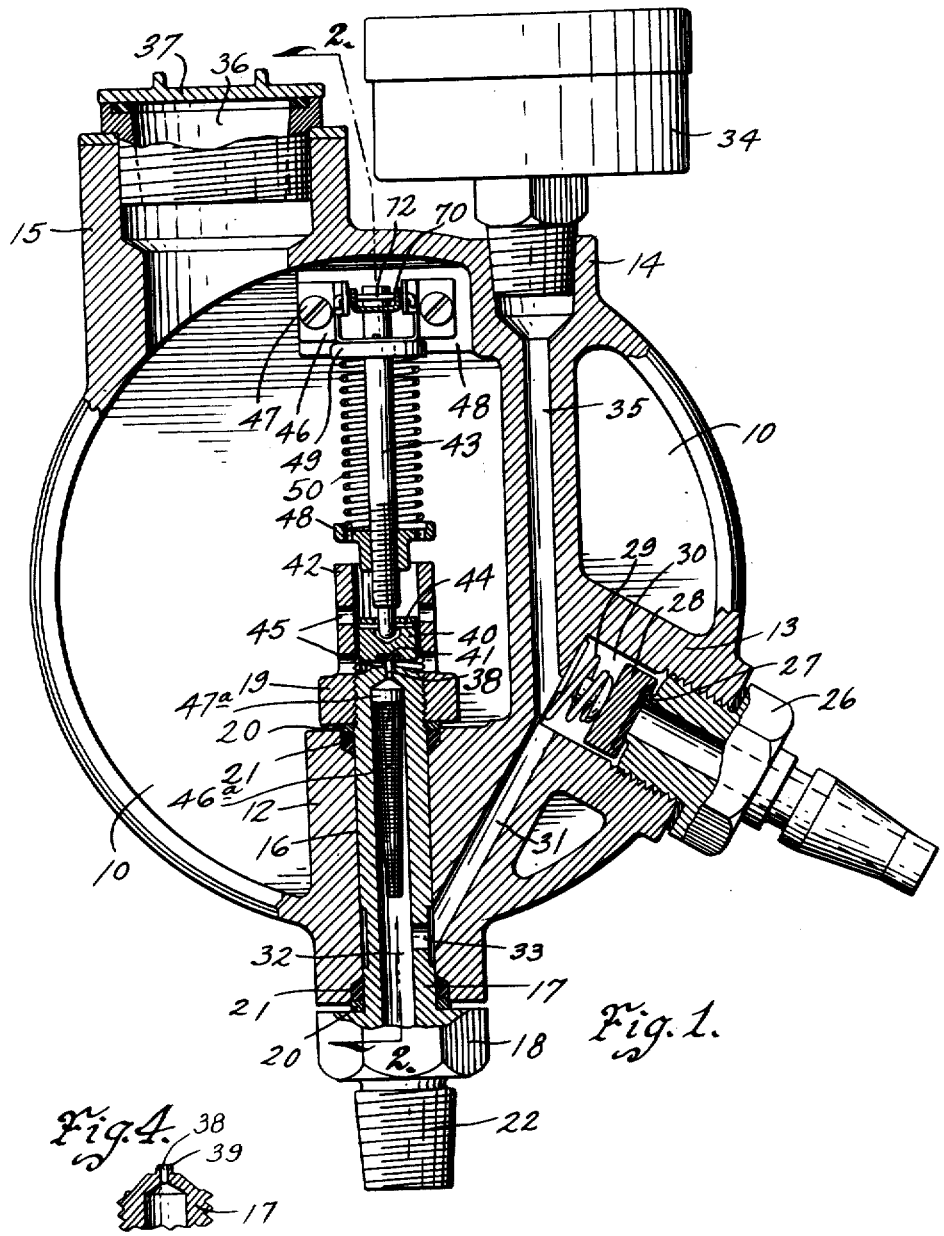
Figure 1 is a vertical, partially sectional view through an oxygen demand regulator embodying our invention, the device being somewhat enlarged with respect to the actual or full size of the device.
Figure 4 is an enlarged sectional view of a control valve seat used in our regulator.

On the accompanying drawings we have used the reference numeral 10 to indicate a casing. The casing 10 is cylindrical and is provided with a number of bosses for receiving various accessories and providing communication between these accessories and the internal parts of the casing. Specifically, there are four bosses, 12, 13, 14 and 15, which will now be described in detail.

The boss 12 has a bore 16 receiving a valve sleeve 17. The valve sleeve 17 has a head 18, and is retained in position by a nut 19. A pair of washers or packing glands 20 and a pair of packing rings 21 are associated with the head 18 and the nut 19 for providing a leak-proof joint between the sleeve 17 and the boss 12 or casing 10 when the nut is tightened in position.

The lower end of the valve sleeve 17 is threaded, as at 22, for connection to an oxygen tank. These tanks are now available in small sizes. The tanks weigh about one pound, and have an oxygen pressure of five hundred pounds per square inch. This tank, together with the regulator itself, is supported by a spring clip 23 mounted by means of a yoke 24 on the casing 10. The yoke is secured to a flange 25 projecting from the back of the casing 10. The clip 23 may be clipped to any convenient point on the user's clothing, and will adequately support the regulator and the oxygen tank.

The boss 13 receives a fitting 26 having a tapered nipple projecting therefrom for gas-tight coaction with a sleeve of a large oxygen tank. The valve of the large tank may then be turned on, and gas will be forced through the fitting 26.

The fitting 26 has a valve seat 27 at its inner end against which a valve plug 28 is normally seated by a spring 29. The valve plug is mounted in a chamber 30 which is connected by a passageway 31 with a bore 32 of the valve sleeve 17. A lateral opening 33 is provided in the valve sleeve for permitting flow of gas from the passageway 31 into the fitting 22 for thereby recharging the small tank from the large tank. In this way a pilot in an airplane may move freely about the cabin of the plane, securing oxygen from the small tank, and may recharge it when desired from a large stationary tank mounted permanently at one position in the plane. It is then not necessary to have a long flexible hose for permitting free movement while receiving oxygen from the large stationary tank.

Also, when a jump by parachute is to be made from a high altitude, it is necessary to have a small oxygen tank for the pilot to carry with him, and it may be recharged just before making a jump. At all times the pressure in the small tank can be readily determined by glancing down and observing a pressure gauge 34 which is screwed into the boss 14. This pressure gauge communicates directly with the small tank by means of a passageway 35 connected with the passageway 31.

The boss 16 has screwed thereinto a sleeve 36 which is tapered to fit a corresponding nipple of the gas mask. This sleeve is normally closed by a hinged cover plate 37, a suitable spring being provided in the hinge connection to maintain the closure. The regulator is thus protected from the entrance of undesirable dust when not in use.

One of the problems arising in the construction of an oxygen regulator of the demand type is the mounting of the control valve, which mounting we have designed as already described in connection with reference numerals 16 through 21. The upper end of the valve sleeve 17 terminates in a narrow seat surrounding a small discharge orifice 38. An enlargement of this seat is shown in Figure 4. The seat referred to is indicated at 39. Normally seated against this seat is a valve plug 40 having a disk of rubber or the like 41 embedded therein for contact with the seat.

The valve plug 40 is loosely guided in a sleeve portion 42 of the nut 19 and is connected to a valve stem 43 by a cross-pin 44. The sleeve 42 has perforations 45 therein to permit free escape of gas. The valve stem 43 extends slidably through a bracket 46, which bracket is secured by screws 47 to a flat boss 48 in the casing 10.

Threaded on the stem 43 is an adjusting nut 48, and interposed between this nut and a cup washer 49, arranged against the bottom of the bracket 46 is a spring 50. The spring 50 normally retains the valve plug 40 in seated position with light pressure, such pressure being, however, sufficient to oppose the five hundred pounds per square inch pressure in the orifice 38. The orifice, however, is very small, so that the actual pressure of the gas against the valve plug is very slight, and yet the orifice is large enough to supply an adequate amount of oxygen for proper breathing when the valve is opened as the user inhales, as will hereinafter appear. We have found that an orifice of approximately .040 inch is satisfactory for this purpose.

The valve plug 40 is to be opened by the expedient of the user inhaling. Therefore, the pressure of the spring 50 must be relatively light, and in order to overcome the pressure of the spring there must be provided a pressure responsive element which is very sensitive and a linkage system which is not complicated, yet provides considerable leverage for opening the valve. This we provide in the form of a relatively large, yet thin and flexible diaphragm 51 in the form of a disk of rubber or the like, spannning the entire open end of the casing 10. The disk 51 has an annular bead or bulge 52 and an annular marginal edge 53 which surrounds the open end of the casing 10. This open end is provided with a peripheral groove 54, and a rubber band 55 is positioned around the marginal edge of the diaphragm and over the groove, the band being under tension for crowding the diaphragm into the groove 54, as shown in Figure 5. A casing cover 60 in the form of a shallow cap is then placed over the rubber band and held in place against a shoulder 61 by a screw 62. The cover 60 may have a name or data plate 63 mounted thereon, and the two are provided with a central opening 64 to permit free access of atmosphere to the outside of the diaphragm 51.

A light sheet metal spider 65 is positioned against the inner face of the diaphragm 51. This spider may be in the form of a ring with a central disk portion, the two being connected by three spoke-like webs. Outside of the diaphragm a washer 66 is positioned and a tubular rivet 67 connects together the center portion of the spider 65 and the washer 66. A short length of wire 68 is then soldered into the rivet and bent L-shape. This wire passes through a slot 69 of a bell crank 70. The bell crank 70 is made of light sheet metal, and throughout its major portion is channel-shaped in cross-section to secure rigidity against undesired bending thereof. The slot 69 is formed in a long arm of the bell crank, and a short arm thereof is pivoted by a pin 71 to the valve stem 43. Closely adjacent the pivot pin 71 is a pivot pin 72 for pivoting the bell crank with relation to the stationary bracket 46.

A tubular filter screen, having a closed lower end, is provided at 46ª to filter the gas received from the valve bore 32 before it enters the casing 10. This screen is supported by an annular ring 47ª.

*Practical operation*

In the operation of our gas regulator, when a gas mask is connected with the fitting 36 and is worn by the user, each time he inhales a partial vacuum will be produced within the casing 10 behind the diaphragm 51. Surrounding atmospheric pressure will thereupon act through the opening 64 on the outer surface of the diaphragm and force the diaphragm inwardly. This will swing the bell crank 70 counter-clockwise in Figure 2, thereby slightly opening the valve 39—40 to permit gas to flow from the small gas tank attached to the fitting 22 into the casing 10, and then through the fitting 36 into the gas mask. Upon exhalation, a slight pressure will be built up in the casing 10, and the degree of this pressure is determined by the outlet check valve of the gas mask. Any pressure above that for which the outlet valve is set will result in gas from the lungs being expelled to atmosphere from the gas mask. Accordingly, each inhalation will open the valve of the gas regulator, permitting the necessary gas to be supplied to the user, and each exhalation will close the valve. The deeper the user breathes, the wider will the regulator valve open, thus automatically supplying the demands of the user.

The diaphragm 51, being made of thin and flexible material, and the linkage including the bell crank 70, which is made of light material so as to reduce the forces of momentum and inertia to a minimum, provide for a very sensitive control of the valve, with a minimum of breathing effort on the part of the user.

The nut 48 is primarily designed as a factory adjustment, accomplished by rotating the nut relative to the stem while holding the lower end of the spring 50 disconnected from the nut. The spring may then be reconnected, and will serve to retain the nut in its newly adjusted position. This nut may also be used to change the adjustment to fit individual requirements, if found desirable.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In an oxygen regulator of the character disclosed, a casing having an open side and adjacent the opposite side having a valve sleeve provided with a small orifice at its inner end surrounded by a valve seat, a valve plug adapted for seating thereagainst, a stem connected with said valve plug, a bracket in said casing, said stem extending slidably through said bracket and having a threaded part, an adjusting nut on the threaded part of said stem, a spring interposed between said bracket and said nut for normally retaining said valve plug against said valve seat, the ends of said spring being connected with said bracket and said adjusting nut to retain the adjustment, a diaphragm spanning the open side of said casing, said diaphragm being formed of thin, flexible material, a reinforcing spider of thin sheet metal connected with said diaphragm and carrying a connecting pin, a bell crank lever pivoted to said bracket and to said valve stem and having a long arm provided with a slot connection to said pin, said diaphragm, upon withdrawal of gas from said casing, opening said valve against the bias of said spring.

2. In a demand type oxygen regulator, a casing having an open front and adjacent and parallel to the back having a boss provided with a bore, a valve sleeve in said bore and having an enlargement, a nut on said sleeve in opposition to said enlargement for cooperating with said enlargement and thereby holding the sleeve assembled in said boss, said sleeve at its inner end having a small orifice surrounded by a valve seat, a valve plug adapted for seating thereagainst said nut having a perforated guide sleeve for said valve plug, a stem connected with said valve plug, a bracket in said casing, said stem extending through said bracket and being threaded, an adjusting nut on said stem threads, a spring interposed between said bracket and said adjusting nut for normally retaining said valve plug against said valve seat, a diaphragm spanning said open front of said casing and having its marginal edge extending around the open end of the casing, a resilient band around said marginal edge, a cover for said casing having a ring portion surrounding said resilient band and having an opening to admit atmospheric pressure to the outer side of said diaphragm, a bell crank lever pivoted to said bracket, said bell crank lever having a short arm operatively connected with said valve plug and a long arm operatively connected with said diaphragm, said diaphragm, upon withdrawal of gas from said casing, opening said valve against the bias of said spring only.

JAMES P. JOHNSON.
ARTHUR HARMAN TIDD.